(12) United States Patent
Matsuda et al.

(10) Patent No.: US 12,104,538 B2
(45) Date of Patent: Oct. 1, 2024

(54) ELECTRIC POWER GENERATION CONTROLLER FOR USE IN AIRCRAFT

(71) Applicant: KAWASAKI JUKOGYO KABUSHIKI KAISHA, Kobe (JP)

(72) Inventors: Kippei Matsuda, Kobe (JP); Kenji Usuki, Kobe (JP); Kenichiro Tanaka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 403 days.

(21) Appl. No.: 17/294,025

(22) PCT Filed: Nov. 19, 2018

(86) PCT No.: PCT/JP2018/042640
§ 371 (c)(1),
(2) Date: May 14, 2021

(87) PCT Pub. No.: WO2020/105081
PCT Pub. Date: May 28, 2020

(65) Prior Publication Data
US 2022/0003169 A1 Jan. 6, 2022

(51) Int. Cl.
*F02C 7/32* (2006.01)
*B64D 31/14* (2006.01)
(Continued)

(52) U.S. Cl.
CPC ............. *F02C 7/32* (2013.01); *B64D 31/14* (2013.01); *F01D 15/10* (2013.01); *F02C 7/36* (2013.01);
(Continued)

(58) Field of Classification Search
CPC ... F02C 7/32; F02C 7/36; B64D 31/14; B64D 2041/002; F01D 15/10; H02K 7/18;
(Continued)

(56) References Cited

U.S. PATENT DOCUMENTS 4,943,268 A 7/1990 Eisenmann et al.
2001/0003108 A1 6/2001 Goi et al.
(Continued)

FOREIGN PATENT DOCUMENTS

JP 02-147438 A 6/1990
JP 2001-158400 A 6/2001

*Primary Examiner* — Joseph Ortega
(74) *Attorney, Agent, or Firm* — Sughrue Mion, PLLC (57) ABSTRACT

An electric power generation controller for use in an aircraft to control an electric power generating apparatus including a manual transmission which changes speed of rotational power of an aircraft engine, transmits the rotational power to an electric power generator, and includes a plurality of gear stages. The electric power generation controller includes: a rotational frequency receiving section configured to receive an input rotational frequency or an output rotational frequency of the manual transmission as a monitoring rotational frequency; and a manual transmission control section configured to, when the monitoring rotational frequency exceeds a first threshold, output a shift-down signal to perform shift-down from an upper stage to a lower stage, and when the monitoring rotational frequency falls below a second threshold, output a shift-up signal to perform shift-up from the lower stage to the upper stage, the first threshold being set to a value larger than the second threshold.

6 Claims, 3 Drawing Sheets

(51) Int. Cl.
    *F01D 15/10*      (2006.01)
    *F02C 7/36*      (2006.01)
    *H02K 7/18*      (2006.01)
    *H02P 9/06*      (2006.01)
    *H02P 9/42*      (2006.01)
    *B64D 41/00*      (2006.01)
    *H02P 101/30*      (2015.01)

(52) U.S. Cl.
    CPC ............... *H02K 7/18* (2013.01); *H02P 9/06* (2013.01); *H02P 9/42* (2013.01); *B64D 2041/002* (2013.01); *F05D 2220/323* (2013.01); *F05D 2220/76* (2013.01); *F05D 2270/02* (2013.01); *F05D 2270/66* (2013.01); *H02P 2101/30* (2015.01)

(58) Field of Classification Search
    CPC .......... H02P 9/06; H02P 9/42; H02P 2101/30; F05D 2220/323; F05D 2220/76; F05D 2270/02; F05D 2270/66; F05D 2260/4031; F05D 2270/024; F05D 2270/304; F16H 61/0213; F16H 37/021; F16H 59/36; F16H 61/00; F16H 59/40; F16H 61/66; F16H 61/702; F16H 2059/366; F16H 2200/0034
    See application file for complete search history.

(56) References Cited

U.S. PATENT DOCUMENTS

2014/0309077 A1* 10/2014 Heglund ................... F16H 1/28
                                                                          475/311
2016/0368614 A1* 12/2016 Endres ...................... F02C 9/18

* cited by examiner

ELECTRIC POWER GENERATION CONTROLLER FOR USE IN AIRCRAFT

CROSS REFERENCE TO RELATED APPLICATIONS

This application is a National Stage of International Application No. PCT/JP2018/042640 filed Nov. 19, 2018.

TECHNICAL FIELD

The present invention relates to a controller of an electric power generating apparatus including a manual transmission which changes the speed of rotational power of an aircraft engine, transmits the rotational power to an electric power generator, and includes a plurality of gear stages.

BACKGROUND ART

Many of aircrafts include, as main power supplies, electric power generating apparatuses driven by flight engines. One example of such electric power generating apparatuses is a drive mechanism-integrated electric power generating apparatus (Integrated Drive Generator; IDG). This electric power generating apparatus integrally includes an electric power generator and a continuously variable transmission arranged upstream of the electric power generator (see PTL 1, for example).

CITATION LIST

Patent Literature

PTL 1: Japanese Laid-Open Patent Application Publication No. 2001-158400

SUMMARY OF INVENTION

Technical Problem

A case where large rotational frequency fluctuation of power taken out from an engine occurs is assumed, and it is necessary to consider a configuration capable of, even when a rotational frequency fluctuation range of the power input to the electric power generating apparatus becomes large, adjusting a rotational frequency of the power to an appropriate rotational frequency and transmitting the power to the electric power generator. As a countermeasure against this, if a speed change range of a continuously variable transmission of the electric power generating apparatus is made large, the continuously variable transmission needs to be increased in diameter, and the entire apparatus is increased in size, which is not preferable. As a countermeasure which deals with the large rotational frequency fluctuation while preventing the electric power generating apparatus from increasing in size, one idea is that: a small manual transmission (for example, two-stage manual transmission) is provided upstream of the electric power generating apparatus; and the rotational frequency fluctuation range of the power input to the electric power generating apparatus is narrowed by a speed change operation of the manual transmission.

However, since gear shift shock is generated when the manual transmission performs speed change, the rotational frequency of the power input to the electric power generating apparatus may momentarily and largely fluctuate. When an aircraft flies for a while at an engine rotational frequency close to a speed change threshold of the manual transmission, such momentary and large fluctuation of the rotational frequency is repeated, and therefore, stable electric power generation becomes difficult.

An object of the present invention is to provide a controller of an electric power generating apparatus including a manual transmission provided upstream of an electric power generator, the controller being configured to prevent frequent occurrence of momentary rotational frequency fluctuation and stabilize electric power generation.

Solution to Problem

An electric power generation controller for use in an aircraft according to one aspect of the present invention is a controller of an electric power generating apparatus including a manual transmission which changes speed of rotational power of an aircraft engine, transmits the rotational power to an electric power generator, and includes a plurality of gear stages. The electric power generation controller includes: a rotational frequency receiving section configured to receive an input rotational frequency or an output rotational frequency of the manual transmission as a monitoring rotational frequency; and a manual transmission control section configured to, when the monitoring rotational frequency exceeds a first threshold, output a shift-down signal which makes the manual transmission perform shift-down from an upper stage to a lower stage, and when the monitoring rotational frequency falls below a second threshold, output a shift-up signal which makes the manual transmission perform shift-up from the lower stage to the upper stage, the first threshold being set to a value larger than the second threshold.

According to the above configuration, the first threshold at the time of the shift-down is larger in value than the second threshold at the time of the shift-up. Therefore, it is possible to prevent a case where the monitoring rotational frequency exceeds the first threshold, the shift-down is performed, the monitoring rotational frequency fluctuates and immediately falls below the second threshold, and the shift-up is performed. On this account, in the electric power generating apparatus including the manual transmission provided upstream of the electric power generator, frequent occurrence of momentary rotational frequency fluctuation can be prevented, and electric power generation can be stabilized.

The monitoring rotational frequency may be the output rotational frequency of the manual transmission. When a lower limit and an upper limit in a full range of the output rotational frequency are respectively regarded as 0% and 100%, the manual transmission control section may set the first threshold in a range of 60% to 100% of the full range and set the second threshold in a range of 20% to 40% of the full range.

According to the above configuration, as with the above, each of the first and second thresholds is set in a range different from a rotational frequency range of cruising of the aircraft. Therefore, after the monitoring rotational frequency exceeds the first threshold, and the shift-down is performed, the monitoring rotational frequency highly possibly increases without decreasing. Moreover, after the monitoring rotational frequency falls below the second threshold, and the shift-up is performed, the monitoring rotational frequency highly possibly decreases without increasing. On this account, it is possible to further prevent a case where the monitoring rotational frequency fluctuates and immediately falls below the second threshold, and the shift-up is performed.

The monitoring rotational frequency may be the input rotational frequency of the manual transmission. When a lower limit and an upper limit in a full range of the input rotational frequency are respectively regarded as 0% and 100%, the manual transmission control section may set the first threshold in a range of 30% to 50% of the full range and set the second threshold in a range of 20% to 40% of the full range.

According to the above configuration, each of the first and second thresholds is set in a range different from the rotational frequency range of the cruising of the aircraft. Therefore, after the monitoring rotational frequency exceeds the first threshold, and the shift-down is performed, the monitoring rotational frequency highly possibly increases without decreasing. Moreover, after the monitoring rotational frequency falls below the second threshold, and the shift-up is performed, the monitoring rotational frequency highly possibly decreases without increasing. On this account, it is possible to further prevent a case where the monitoring rotational frequency fluctuates and immediately falls below the second threshold, and the shift-up is performed.

The manual transmission control section may set the first threshold and the second threshold such that the monitoring rotational frequency exceeds the first threshold in a period from take-off of the aircraft to cruising of the aircraft, and the monitoring rotational frequency falls below the second rotational frequency in a period from the cruising of the aircraft to landing of the aircraft.

According to the above configuration, after the monitoring rotational frequency exceeds the first threshold, and the shift-down is performed, the monitoring rotational frequency highly possibly increases without decreasing. Moreover, after the monitoring rotational frequency falls below the second threshold, and the shift-up is performed, the monitoring rotational frequency highly possibly decreases without increasing. On this account, it is possible to further prevent a case where the monitoring rotational frequency fluctuates and immediately falls below the second threshold, and the shift-up is performed.

A continuously variable transmission may be interposed on a power transmission path between the manual transmission and the electric power generator. The transmission controller may further include a continuously variable transmission control section configured to control the continuously variable transmission based on an input rotational frequency of the continuously variable transmission such that a rotational frequency input to the electric power generator becomes constant. The rotational frequency receiving section may receive the output rotational frequency of the manual transmission as the input rotational frequency of the continuously variable transmission and receive the output rotational frequency of the manual transmission as the monitoring rotational frequency.

According to the above configuration, the rotational frequency sensor used to control the manual transmission and the rotational frequency sensor used to control the continuously variable transmission can be used in common, and therefore, the number of sensors can be reduced. Moreover, when the monitoring rotational frequency used for threshold determination of the manual transmission control section is the output rotational frequency of the manual transmission, a difference between the first and second thresholds can be easily made larger than that when the monitoring rotational frequency is the input output rotational frequency of the manual transmission. Therefore, it is possible to further suitably prevent a case where the monitoring rotational frequency fluctuates, and the speed change is repeated in a short period of time.

An electric power generating apparatus for use in an aircraft according to another aspect of the present invention includes: the above electric power generation controller; a manual transmission configured to change speed of rotational power of an aircraft engine and including a plurality of gear stages; and an electric power generator to which the power which has been change in speed by the manual transmission is transmitted.

According to the above configuration, as described above, in the electric power generating apparatus including the manual transmission provided upstream of the electric power generator, the frequent occurrence of the momentary rotational frequency fluctuation can be prevented, and the electric power generation can be stabilized.

Advantageous Effects of Invention

According to the present invention, in the electric power generating apparatus including the manual transmission provided upstream of the electric power generator, the frequent occurrence of the momentary rotational frequency fluctuation can be prevented, and the electric power generation can be stabilized.

DESCRIPTION OF EMBODIMENTS

Hereinafter, an embodiment will be described with reference to the drawings.

Figure 1:
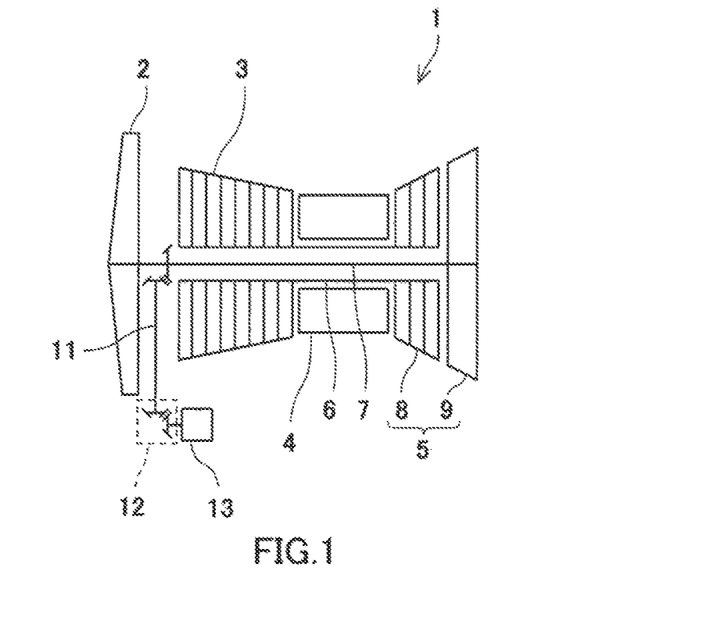
FIG. 1 is a schematic diagram showing an aircraft engine and an electric power generating apparatus according to an embodiment.

FIG. 1 is a schematic diagram showing an aircraft engine 1 and an electric power generating apparatus 13 according to the embodiment. As shown in FIG. 1, the aircraft engine 1 is a two-shaft gas turbine engine and includes a fan 2, a compressor 3, a combustor 4, a turbine 5, a high-pressure shaft 6, and a low-pressure shaft 7. The fan 2 is arranged at a front portion of the aircraft engine 1 and is surrounded by a fan casing. The turbine 5 includes a high-pressure turbine 8 at a front stage side and a low-pressure turbine 9 at a rear stage side. The high-pressure turbine 8 is coupled to the compressor 3 through the high-pressure shaft 6. The high-pressure shaft 6 is a tubular shaft body including therein a hollow space. The low-pressure turbine 9 is coupled to the fan 2 through the low-pressure shaft 7. The low-pressure shaft 7 is inserted into the hollow space of the high-pressure shaft 6.

A connecting shaft 11 extending outward in a radial direction is connected to the low-pressure shaft 7 such that the low-pressure shaft 7 can transmit power to the connecting shaft 11. A gear box 12 is connected to the connecting shaft 11 such that the connecting shaft 11 can transmit the power to the gear box 12. The electric power generating apparatus 13 is connected to the gear box 12 such that the gear box 12 can transmit the power to the electric power generating apparatus 13. To be specific, rotational power of the low-pressure shaft 7 is transmitted through the connecting shaft 11 and the gear box 12 to the electric power generating apparatus 13. Since rotational frequency fluctuation of the low-pressure shaft 7 is larger than rotational frequency fluctuation of the high-pressure shaft 6, a rotational frequency fluctuation range of the power input to the electric power generating apparatus 13 becomes large. It should be noted that the power to be transmitted to the electric power generating apparatus 13 may be taken out from the high-pressure shaft 6 instead of the low-pressure shaft 7.

Figure 2:
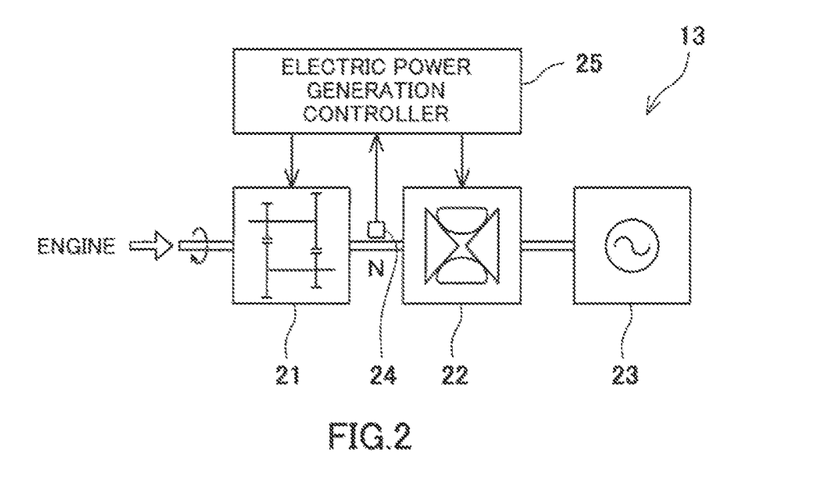
FIG. 2 is a block diagram showing the electric power generating apparatus shown in FIG. 1.

FIG. 2 is a block diagram showing the electric power generating apparatus 13 shown in FIG. 1. As shown in FIG. 2, the electric power generating apparatus 13 includes a manual transmission 21, a continuously variable transmission 22, an electric power generator 23, and an electric power generation controller 25. The electric power generating apparatus 13 includes a rotational frequency sensor 24 as a sensor. The rotational power taken out from the low-pressure shaft 7 of the aircraft engine 1 is changed in speed by the manual transmission 21 and the continuously variable transmission 22 and is then input to the electric power generator 23, and electric power generated by the electric power generator 23 is supplied to an electrical apparatus (not shown) of the aircraft. To be specific, a case where large rotational frequency fluctuation of the power taken out from the engine 1 occurs is assumed, and a rotational frequency of the power is adjusted by the manual transmission 21 and the continuously variable transmission 22 such that the rotational frequency of the power input to the electric power generator 23 stabilizes.

The rotational power taken out from the aircraft engine 1 is input to the manual transmission 21. The manual transmission 21 is a transmission configured to select a gear train, by which the power is transmitted, from a plurality of gear trains and perform speed change. When switching the gear train by which the power is transmitted, an output rotational frequency of the manual transmission 21 fluctuates. In the present embodiment, as one example, the manual transmission 21 is of a two-stage speed change type and includes a lower stage (equal speed stage) and an upper stage (speed increasing stage) having a larger change gear ratio (smaller reduction ratio) than the lower stage. When performing shift-up from the lower stage to the upper stage or performing shift-down from the upper stage to the lower stage, the manual transmission 21 changes from a state where one gear train is being selected to a state where another gear train is being selected through a disengaged state (neutral state). It should be noted that the present embodiment has described a case where the manual transmission 21 includes only two gear stages. However, the number of gear stages may be more than two.

The rotational power which has been changed in speed by and output from the manual transmission 21 is input to the continuously variable transmission 22. For example, a toroidal continuously variable transmission can be used as the continuously variable transmission 22. The toroidal continuously variable transmission changes the change gear ratio in such a manner that a power roller sandwiched by input and output discs is tilted by changing the position of the power roller by an actuator. Since the toroidal continuously variable transmission is publicly known, the explanation of a detailed structure thereof is omitted. It should be noted that the continuously variable transmission may be of a different type, and for example, may be a hydraulic transmission (Hydro Static Transmission).

The rotational power which has been changed in speed by and output from the continuously variable transmission 22 is input to the electric power generator 23. The electric power generator 23 is an AC generator. When the power having a constant rotational frequency is input to the electric power generator 23, the electric power generator 23 generates alternating current having a constant frequency. The rotational frequency sensor 24 detects the rotational frequency of a power transmitting shaft between the manual transmission 21 and the continuously variable transmission 22. The electric power generation controller 25 controls a speed change operation of the manual transmission 21 and a speed change operation of the continuously variable transmission 22 in accordance with the rotational frequency detected by the rotational frequency sensor 24. It should be noted that the continuously variable transmission 22 does not have to be provided, and the frequency of the alternating current generated by the electric power generator 23 does not have to be constant.

Figure 3:
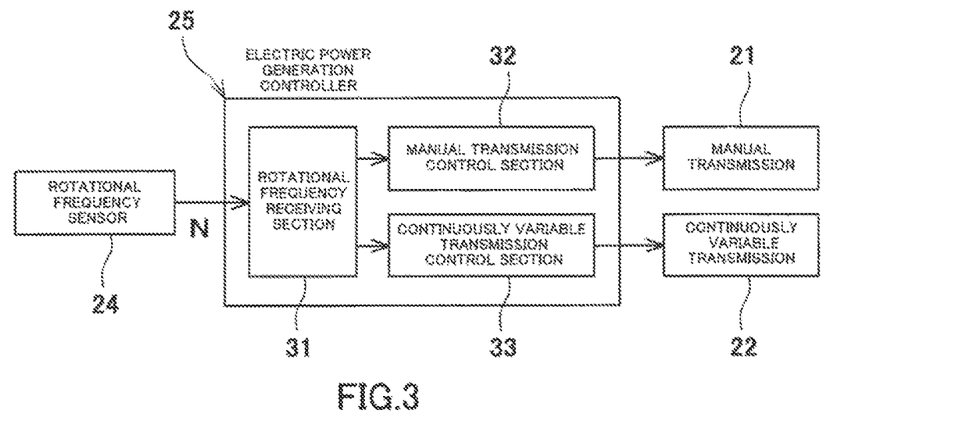
FIG. 3 is a block diagram showing an electric power generation controller shown in FIG. 2.

FIG. 3 is a block diagram showing the electric power generation controller 25 shown in FIG. 2. As shown in FIG. 3, the electric power generation controller 25 includes a processor, a volatile memory, a non-volatile memory, an I/O interface, and the like in terms of hardware. Moreover, the electric power generation controller 25 includes a rotational frequency receiving section 31, a manual transmission control section 32, and a continuously variable transmission control section 33 in terms of software. The rotational frequency receiving section 31 is realized by the I/O interface. Each of the manual transmission control section 32 and the continuously variable transmission control section 33 is realized in such a manner that the processor performs calculation processing by using the volatile memory based on a program stored in the non-volatile memory.

The rotational frequency receiving section 31 receives the output rotational frequency of the manual transmission 21 detected by the rotational frequency sensor 24, as a monitoring rotational frequency N used to control the manual transmission 21. Since the output rotational frequency of the manual transmission 21 detected by the rotational frequency sensor 24 is also an input rotational frequency of the continuously variable transmission 22, the monitoring rotational frequency N is also utilized as a monitoring rotational frequency used to control the continuously variable transmission 22. It should be noted that a gear may be interposed between the manual transmission 21 and the continuously variable transmission 22, and an output rotational frequency N2 of the manual transmission 21 does not have to coincide with the input rotational frequency of the continuously variable transmission 22.

When the monitoring rotational frequency N exceeds a first threshold A1, the manual transmission control section 32 outputs a shift-down signal which makes the manual transmission 21 perform the shift-down from the upper stage to the lower stage. When the monitoring rotational frequency N falls below a second threshold A2, the manual transmission control section 32 outputs a shift-up signal which makes the manual transmission 21 perform the shift-up from the lower stage to the upper stage. The first threshold A1 is set to a value larger than the second threshold A2.

The continuously variable transmission control section 33 continuously controls the change gear ratio of the continuously variable transmission 22 in accordance with the monitoring rotational frequency N such that the rotational frequency of the power input from the continuously variable transmission 22 to the electric power generator 23 becomes constant. To be specific, when the monitoring rotational frequency N increases, the continuously variable transmission control section 33 changes the change gear ratio of the continuously variable transmission 22 to a speed-decrease side. Moreover, when the monitoring rotational frequency N decreases, the continuously variable transmission control section 33 changes the change gear ratio of the continuously variable transmission 22 to a speed-increase side.

Figure 4:
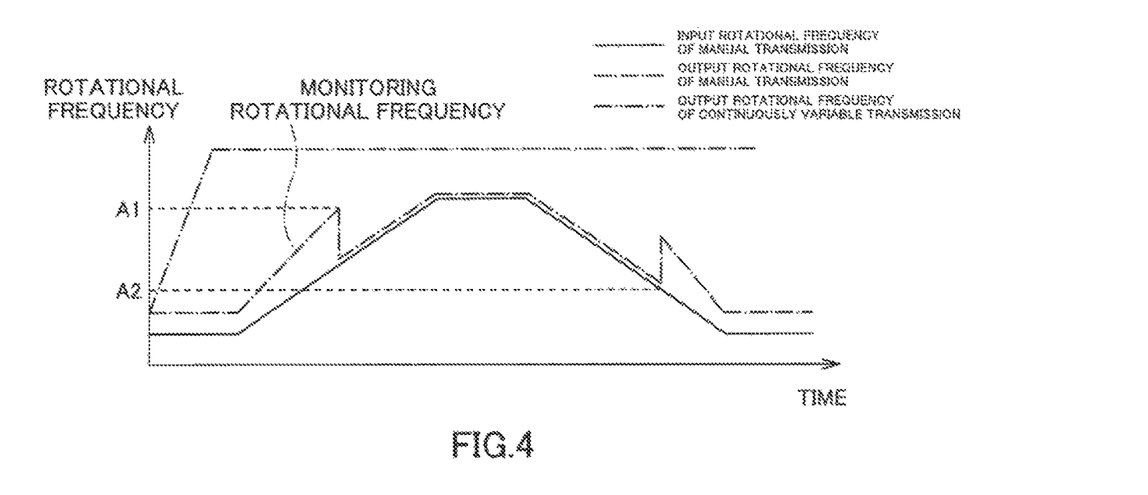
FIG. 4 is a graph showing a relationship among an input rotational frequency and an output rotational frequency of a manual transmission shown in FIG. 2 and an output rotational frequency of a continuously variable transmission shown in FIG. 2.

FIG. 4 is a graph showing a relationship among the input rotational frequency and the output rotational frequency of the manual transmission 21 shown in FIG. 2 and the output rotational frequency of the continuously variable transmission 22 shown in FIG. 2. It should be noted that FIG. 4 shows an example of two-stage speed change in which the upper stage (high-speed stage) corresponds to speed increase, and the lower stage (low-speed stage) corresponds to equal speed. However, the present embodiment is not limited to this as long as a speed increasing ratio of the upper stage is larger than that of the lower stage (the reduction ratio of the upper stage is smaller than that of the lower stage). As shown in FIG. 4, the monitoring rotational frequency is the output rotational frequency of the manual transmission 21. The manual transmission control section 32 sets the first threshold A1 and the second threshold A2 such that: the monitoring rotational frequency exceeds the first threshold A1 in a period from take-off of the aircraft to cruising of the aircraft and falls below the second rotational frequency A2 in a period from the cruising of the aircraft to landing of the aircraft.

According to the above configuration, the first threshold A1 at the time of the shift-up is larger in value than the second threshold A2 at the time of the shift-down. Therefore, it is possible to prevent a case where at the time of acceleration of the aircraft engine 1, the monitoring rotational frequency N exceeds the first threshold A1, the shift-down is performed, the monitoring rotational frequency N fluctuates and immediately falls below the second threshold A2, and the shift-up is performed. Moreover, it is possible to prevent a case where at the time of deceleration of the aircraft engine 1, the monitoring rotational frequency N falls below the second threshold A2, the shift-up is performed, the monitoring rotational frequency N fluctuates and immediately exceeds the first threshold A1, and the shift-down is performed. On this account, in the electric power generating apparatus 13 including the manual transmission 21 provided upstream of the electric power generator 23, frequent occurrence of the momentary rotational frequency fluctuation can be prevented, and the electric power generation can be stabilized.

When a lower limit and an upper limit in a full range of the output rotational frequency of the manual transmission 21 are respectively regarded as 0% and 100%, for example, the manual transmission control section 31 sets the first threshold A1 in a range of 60% to 100% of the full range and sets the second threshold A2 in a range of 20% to 40% of the full range. According to this setting, each of the first threshold A1 and the second threshold A2 is set in a range different from a rotational frequency range of the cruising of the aircraft. Therefore, after the monitoring rotational frequency N exceeds the first threshold A1, and the shift-up is performed, the monitoring rotational frequency N highly possibly increases without decreasing. Moreover, after the monitoring rotational frequency N falls below the second threshold A2, and the shift-up is performed, the monitoring rotational frequency N highly possibly decreases without increasing. On this account, it is possible to further prevent a case where the monitoring rotational frequency N fluctuates, and the speed change is repeated in a short period of time.

Moreover, the monitoring rotational frequency N (output rotational frequency of the manual transmission 21) that is an input signal of the control of the manual transmission 21 is the same as the rotational frequency (input rotational frequency of the continuously variable transmission 22) that is an input signal of the control of the continuously variable transmission 22. Therefore, the rotational frequency sensor 24 used to control the manual transmission 21 can also be used as a rotational frequency sensor used to control the continuously variable transmission 22, and thus, the number of sensors can be reduced. It should be noted that instead of using the above rotational frequency sensor, a rotational frequency sensor configured to detect the input rotational frequency of the manual transmission 21 may be additionally provided.

Figure 5:
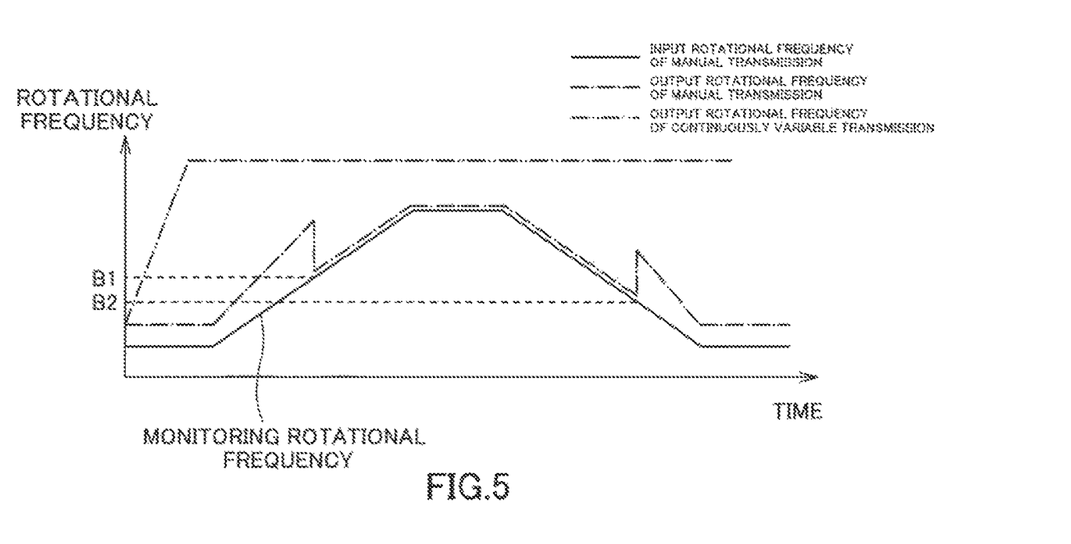
FIG. 5 is a diagram showing Modified Example and corresponding to FIG. 4.

FIG. 5 is a diagram showing Modified Example and corresponding to FIG. 4. As shown in FIG. 5, the monitoring rotational frequency is the input rotational frequency of the manual transmission 21. When the monitoring rotational frequency exceeds a first threshold B1, the manual transmission control section 32 according to Modified Example outputs the shift-down signal which makes the manual transmission 21 perform the shift-down from the upper stage to the lower stage. When the monitoring rotational frequency falls below a second threshold B2, the manual transmission control section 32 according to Modified Example outputs the shift-up signal which makes the manual transmission 21 perform the shift-up from the lower stage to the upper stage. The first threshold B1 is set to a value larger than the second threshold B2. When a lower limit and an upper limit in a full range of the input rotational frequency of the manual transmission 21 are respectively regarded as 0% and 100%, for example, the manual transmission control section 32 sets the first threshold B1 in a range of 30% to 50% of the full range and sets the second threshold B2 in a range of 20% to 40% of the full range.

As is clear from comparison between FIGS. 4 and 5, a difference between the first threshold A1 and the second threshold A2 when the monitoring rotational frequency used for threshold determination of the manual transmission control section 32 is the output rotational frequency of the manual transmission 21 (FIG. 4) is larger than a difference between the first threshold B1 and the second threshold B2 when the monitoring rotational frequency used for threshold determination of the manual transmission control section 32 is the input rotational frequency of the manual transmission 21 (FIG. 5). Therefore, when the monitoring rotational frequency used for the threshold determination of the manual transmission control section 32 is set to the output rotational frequency of the manual transmission 21, it is possible to reduce a possibility that when the monitoring rotational frequency fluctuates due to influence, such as sensor noise, the monitoring rotational frequency mistakenly exceeds the first threshold A1 (or falls below the second threshold A2). Thus, the risk of the inappropriate speed change operation can be reduced.

REFERENCE SIGNS LIST 1 aircraft engine
13 electric power generating apparatus
21 manual transmission
22 continuously variable transmission
23 electric power generator
24 rotational frequency sensor
25 electric power generation controller
31 rotational frequency receiving section
32 manual transmission control section
33 continuously variable transmission control section

The invention claimed is:

1. An electric power generation controller for use in an aircraft,
the electric power generation controller being a controller of an electric power generating apparatus including a manual transmission which changes speed of rotational power of an aircraft engine, transmits the rotational power to an electric power generator, and includes a plurality of gear stages,
the electric power generation controller comprising:
a rotational frequency receiving section configured to receive an input rotational frequency or an output rotational frequency of the manual transmission as a monitoring rotational frequency; and
a manual transmission control section configured to,
in response to determining that the monitoring rotational frequency exceeds a first threshold rotational frequency value, output a shift-down signal which makes the manual transmission perform shift-down from an upper stage to a lower stage, and
in response to determining that the monitoring rotational frequency falls below a second threshold rotational frequency value, output a shift-up signal which makes the manual transmission perform shift-up from the lower stage to the upper stage, the first threshold rotational frequency value being set to a value larger than the second threshold rotational frequency value, wherein:
the monitoring rotational frequency is the output rotational frequency of the manual transmission; and
in response to determining that a lower limit and an upper limit in a full range of the output rotational frequency are respectively regarded as 0% and 100%, the manual transmission control section sets the first threshold rotational frequency value in a range of 60% to 100% of the full range and sets the second threshold rotational frequency value in a range of 20% to 40% of the full range.

2. An electric power generation controller for use in an aircraft,
the electric power generation controller being a controller of an electric power generating apparatus including a manual transmission which changes speed of rotational power of an aircraft engine, transmits the rotational power to an electric power generator, and includes a plurality of gear stages,
the electric power generation controller comprising:
a rotational frequency receiving section configured to receive an input rotational frequency or an output rotational frequency of the manual transmission as a monitoring rotational frequency; and
a manual transmission control section configured to,
in response to determining that the monitoring rotational frequency exceeds a first threshold rotational frequency value, output a shift-down signal which makes the manual transmission perform shift-down from an upper stage to a lower stage, and
in response to determining that the monitoring rotational frequency falls below a second threshold rotational frequency value, output a shift-up signal which makes the manual transmission perform shift-up from the lower stage to the upper stage, the first threshold rotational frequency value being set to a value larger than the second threshold rotational frequency value, wherein:
the monitoring rotational frequency is the input rotational frequency of the manual transmission; and
in response to determining that a lower limit and an upper limit in a full range of the input rotational frequency are respectively regarded as 0% and 100%, the manual transmission control section sets the first threshold rotational frequency value in a range of 30% to 50% of the full range and sets the second threshold rotational frequency value in a range of 20% to 40% of the full range.

3. An electric power generation controller for use in an aircraft,
the electric power generation controller being a controller of an electric power generating apparatus including a manual transmission which changes speed of rotational power of an aircraft engine, transmits the rotational power to an electric power generator, and includes a plurality of gear stages,
the electric power generation controller comprising:
a rotational frequency receiving section configured to receive an input rotational frequency or an output rotational frequency of the manual transmission as a monitoring rotational frequency; and
a manual transmission control section configured to,
in response to determining that the monitoring rotational frequency exceeds a first threshold rotational frequency value, output a shift-down signal which makes the manual transmission perform shift-down from an upper stage to a lower stage, and
in response to determining that the monitoring rotational frequency falls below a second threshold rotational frequency value, output a shift-up signal which makes the manual transmission perform shift-up from the lower stage to the upper stage, the first threshold rotational frequency value being set to a value larger than the second threshold rotational frequency value,
wherein the manual transmission control section sets the first threshold rotational frequency value and the second threshold rotational frequency value such that the monitoring rotational frequency exceeds the first threshold rotational frequency value in a period from take-off of the aircraft to cruising of the aircraft, and the monitoring rotational frequency falls below the second threshold rotational frequency value in a period from the cruising of the aircraft to landing of the aircraft.

4. The electric power generation controller according to claim 1, wherein:
a continuously variable transmission is interposed on a power transmission path between the manual transmission and the electric power generator;
the electric power generation controller further comprises a continuously variable transmission control section configured to control the continuously variable transmission based on an input rotational frequency of the continuously variable transmission such that a rotational frequency input to the electric power generator becomes constant; and the rotational frequency receiving section receives the output rotational frequency of the manual transmission as the input rotational frequency of the continuously variable transmission and receives the output rotational frequency of the manual transmission as the monitoring rotational frequency.

5. The electric power generation controller according to claim 2, wherein:

a continuously variable transmission is interposed on a power transmission path between the manual transmission and the electric power generator;

the electric power generation controller further comprises a continuously variable transmission control section configured to control the continuously variable transmission based on an input rotational frequency of the continuously variable transmission such that a rotational frequency input to the electric power generator becomes constant; and the rotational frequency receiving section receives the output rotational frequency of the manual transmission as the input rotational frequency of the continuously variable transmission and receives the output rotational frequency of the manual transmission as the monitoring rotational frequency.

6. The electric power generation controller according to claim 3, wherein:

a continuously variable transmission is interposed on a power transmission path between the manual transmission and the electric power generator;

the electric power generation controller further comprises a continuously variable transmission control section configured to control the continuously variable transmission based on an input rotational frequency of the continuously variable transmission such that a rotational frequency input to the electric power generator becomes constant; and the rotational frequency receiving section receives the output rotational frequency of the manual transmission as the input rotational frequency of the continuously variable transmission and receives the output rotational frequency of the manual transmission as the monitoring rotational frequency.

* * * * *